United States Patent [19]
Vidler

[11] 3,979,918
[45] Sept. 14, 1976

[54] ROCK BOLTS
[75] Inventor: Norman Brian Vidler, New Lambton Heights, Australia
[73] Assignee: The Titan Manufacturing Company Proprietary Limited, Australia
[22] Filed: Dec. 10, 1974
[21] Appl. No.: 531,383

[30] Foreign Application Priority Data
Dec. 17, 1973 Australia............................ 6009/73

[52] U.S. Cl..................................... 61/45 B; 85/61
[51] Int. Cl.²........................................ E21D 21/00
[58] Field of Search............ 61/45 B; 52/698; 85/61, 85/62

[56] References Cited
UNITED STATES PATENTS
2,725,843  12/1955  Koski.................................. 85/62 X
3,877,235  4/1975  Hill..................................... 61/45 B

*Primary Examiner*—Jacob Shapiro
*Attorney, Agent, or Firm*—Robert E. Burns; Emmanuel J. Lobato; Bruce L. Adams

[57]  ABSTRACT

The present invention relates to chemical anchor rock bolts and to a method of installing the anchor bolts. Such bolts are provided with a clamping member or nut which is adapted while being driven thereby to remain in fixed engagement with the bolt shank during mixing of the chemical anchor resin. Upon setting of the resin and on application of an increased driving torque to the nut, the nut is tightened as required.

4 Claims, 5 Drawing Figures

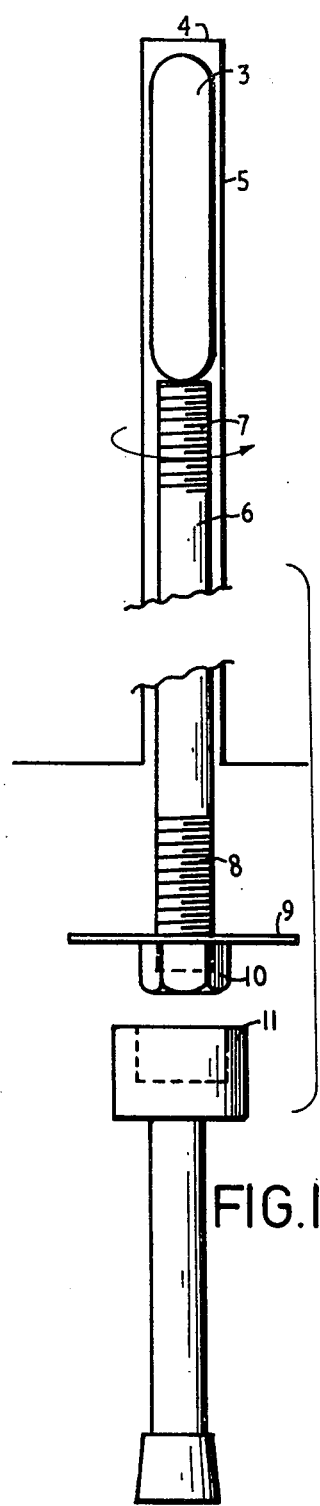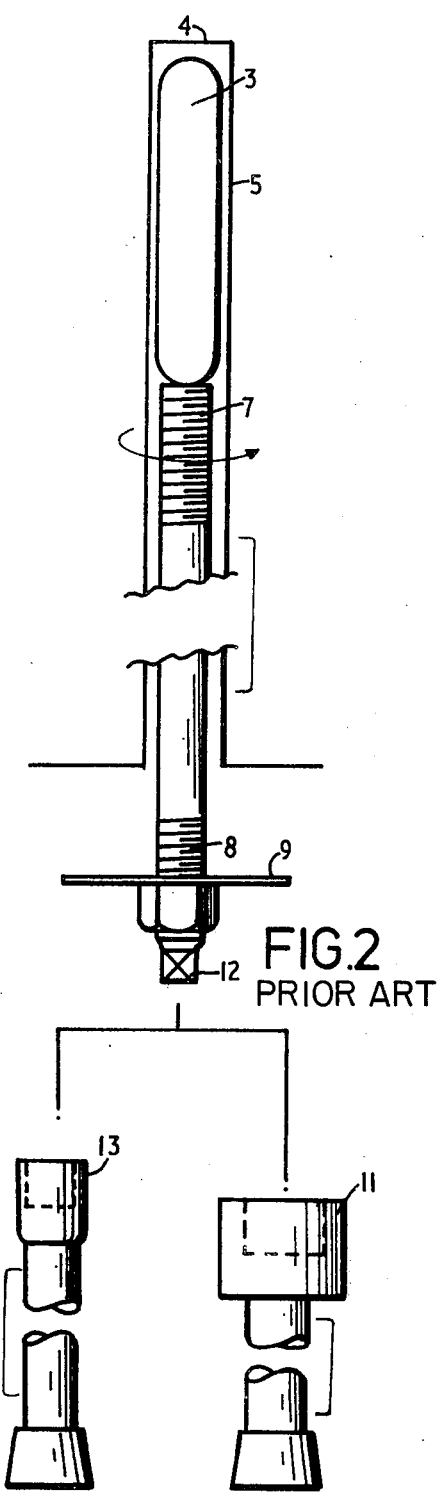
FIG.1
FIG.2
PRIOR ART

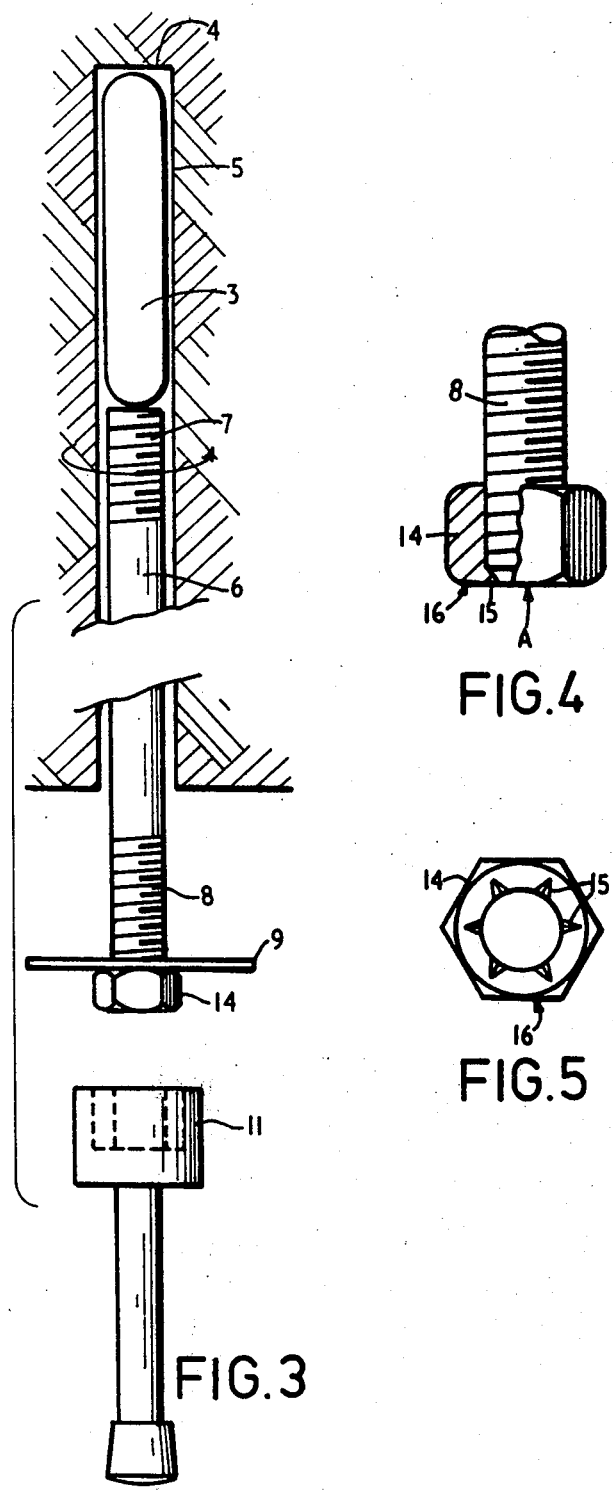

ROCK BOLTS

BACKGROUND OF THE INVENTION

The present invention relates to rock bolts and particularly to a chemical anchor bolt and a method of installing the chemical anchor bolt.

SUMMARY OF THE INVENTION

In the present system for installing chemical anchor bolts, a resin anchor cartridge is placed up a hole in, say, a mine roof and followed by a bolt having a forged square section or the like portion at an end, which protrudes from the hole in the mine roof. A socket tool or, as commonly known in the art, a dolly is placed on the forged square end of the bolt and attached at the other end to a bolting machine. The chemical anchor is "mixed" by rotation and thrust applied simultaneously to the bolt. After mixing, the bolt is held in position for a period of time, for example, between 20 seconds and one minute to allow the chemical anchor to set. The mixing dolly is removed and a nut, which is located together with a washer plate on an exposed threaded portion of the bolt, is tightened by a separate tightening dolly which rotates the nut to apply a desired tension on the bolt.

An object of the present invention is to provide a chemical anchor bolt, which does not require two separate tools or dollies for its installation, and to improve the installation time of such bolts.

Another object of the present invention is to provide an anchor bolt which is more economical to produce as considerable quantities of these bolts are used and any reduction of cost per unit is significant.

The present invention in one general form is a method of installing a chemical anchor bolt comprising the steps of:

a. forming a hole in a material b. placing a container in the hole, the container having therein a chemical anchor resin, c. locating at least a part of the bolt in the hole, the bolt having a threaded portion at, at least, an end thereof remote from said part and the threaded portion having a clamping member in threaded engagement therewith, the clamping member and bolt being rotatable substantially as a unitary member until a predetermined resistance torque between the clamping member and bolt is exceeded.

d. driving the clamping member to cause rupture of the container by the bolt and thereby releasing the chemical anchor resin, e. allowing the chemical anchor resin to set and secure the bolt and, f. applying an increased torque to the clamping member, which increased torque is sufficient to overcome said predetermined resistance torque, and thereby permitting rotation of the clamping member with respect to the bolt.

The present invention in another general form is a chemical anchor bolt comprising a bolt having a thread portion at, at least, one end thereof, a clamping member having an internal threaded portion therein, said clamping member threaded portion locating on said bolt threaded portion, means causing the clamping member and bolt to be held in engagement with respect to each other, whereby, on rotating the clamping member, the bolt is rotatably driven by the clamping member, until a given torque is applied to the bolt, thereupon the clamping member rotates with respect to the bolt.

In one embodiment of the present invention the clamping member and bolt shank threaded portions are formed with a thread pitch differential with respect to each other and thereby causing the clamping member to be held in engagement with the bolt shank.

In another embodiment of the present invention the clamping member is provided with crimped deformations which prevent relative rotation of the clamping members with respect to the bolt until the predetermined torque is exceeded. On exceeding the predetermined torque the deformations are rendered ineffective and the clamping member may then be traversed along the threaded portion of the bolt as required.

BRIEF DESCRIPTION OF THE DRAWINGS

Some preferred embodiments of the present invention will now be described by way of example with reference to the accompanying drawings, wherein:

FIG. 1 is a diagrammatic view of one form of chemical anchor rock bolt according to the present invention;

FIG. 2 is a diagrammatic view of a conventional chemical anchor rock bolt, illustrating the use of separate mixing and tightening dollies;

FIG. 3 is a diagrammatic view of an alternative form of chemical anchor rock bolt according to the present invention;

FIG. 4 is a view of a nut in part section to illustrate a crimped indentation, and FIG. 5 is a view in the direction of arrow A of the nut shown in FIG. 4.

DESCRIPTION OF THE PREFERRED EMBODIMENTS

In FIG. 1, a chemical anchor cartridge or container 3 is shown inserted within and located at the top end 4 of a hole 5 in, say, a mine roof. The cartridge or container 3 is followed by a rock bolt 6 which is threaded at both ends 7 and 8. End 7 of the bolt is threaded to provide a roughened surface to ensure adequate retention by the chemical anchor in the hole.

However, end 7 may be suitably prepared by any other known means. Threaded end 8 of bolt 6 is provided thereon with a washer 9 and a clamping member or nut 10.

Further, the pitch of threaded end 8 is increased by a given predetermined amount with respect to that of the nut, to cause the nut 10 to grip the bolt.

When "mixing" the chemical anchor, the nut 10 is held in a socket tool or tightening dolly 11, which is attached to a bolting machine. The machine causes the nut and consequently the bolt to rotate, by virtue of their thread pitch differential, and simultaneously drive the bolt forward to crush the cartridge 3 and mix the chemical anchor resin.

After mixing the anchor resin is allowed to set to lock the bolt 6 into hole 5.

As the bolt 6 is now prevented from rotating, an increase in torque is required to rotate the nut with respect to the bolt. The thread pitch differential is so determined to give a set resistance to tightening, which a conventional bolting machine is capable of overcoming once bolt 6 is fixedly secured in hole 5, to allow normal tightening to occur. Conventional bolting machines are capable of delivering for example between 74 ft. lbs. torque for portable machines to 250 ft. lbs.

torque for motorised bolting machines. Considering a ¾ inch diameter rock bolt, the normal thread being, say ¾ inch whitworth having a thread pitch of 0.1 inch; by altering the pitch of the bolt to 0.1035 inch, the torque resistance of a medium tolerance ¾ inch whitworth nut on this over pitch bolt is approximately 40 ft. lbs. for a bottom tolerance nut and 35 ft. lbs. for a top tolerance nut. After setting of the chemical anchor and then rotating the nut until there is full thread engagement the torque resistance drops to around 15 ft. lbs., therefore it can be seen that initially the torque resistance of the nut is such that mixing will occur. The torque required for mixing is usually of the order of 10 ft. lbs.

It will be noted that the rock bolt illustrated in FIG. 1 is similar to the conventional rock bolt, as illustrated in FIG. 2, excepting that the forged square portion 12 at end 8 of the rock bolt is eliminated and consequently a mixing dolly 13 is no longer required.

FIGS. 3, 4 and 5 illustrate an alternative form of the present invention, like numerals indicating like components with respect to FIGS. 1 and 2. In the alternative form, the nut or clamping member 14 is provided in the deformations or indentations 15 of which six such indentations are shown in FIG. 5. To obtain a suitably deformed nut, a conventional nut is crimped or pressed to form the indentations into one face 16 of the nut 14. The pressure which is applied to the crimping tool may be varied to give nuts having a variety of predetermined resistance torque settings when screwed onto the bolt 6.

In the manufacture of such a deformed nut 14, a press is utilised to apply a pressure of approximately 3500 lbs. to the crimping tool to produce the deformations, which result in a torque resistance to screwing of between approximately 15 to 25 ft. lbs. if the nut is required to transmit higher loads to the bolt during mixing of the chemical anchor resins, then higher resistance torque setting may be obtained by increasing the size or number of the deformations in the nut.

Use of the alternative form of the present invention is similar to that previously described where the nut and bolt have a relative thread pitch differential. Nut 14 is placed on threaded portion 8 of bolt 6, the crimped deformations 15 being located remote from the bolt. Cartridge 3 containing the chemical anchor is placed in hole 5 and is followed by bolt 6. The mixing and tightening dolly 11 is then positioned on the crimped nut and connected to the bolting machine. The nut and bolt are subsequently rotated and the bolt is simultaneously driven to the top 4 of the hole to crush the cartridge and release the chemical anchor resin. The nut 14 at this stage does not spin and remains locked, thus allowing the bolt to mix the chemical anchor resin.

Following the mixing of the chemical anchor resin, the bolt 6 is held stationary for a period of time sufficient to allow the resin to gel. Some conventional resins for example only require 20 seconds to gel. Finally, having allowed the resin to gel and anchor the bolt, sufficient torque is applied to the nut to overcome the resistance of the crimp deformations and to move the nut up the bolt thread to tension the bolt. Those skilled in the art will appreciate that the elimination of an additional operation, namely that of changing from a mixing dolly to a tightening dolly will greatly improve the productivity of a mine operation in rock bolting operations. Further, the production unit cost saving in eliminating the mixing square forging 12 from the conventional bolt, is also significant when considering the large number of units produced.

Further those skilled in the art will appreciate that deformations may be made in the threaded portion 8 on the bolt shank as opposed to the nut. Such deformations may be positioned along the threaded portion by an amount sufficient to allow the nut to be screwed onto the bolt before engagement with the deformations.

What I claim is:
1. A method of installing a chemical anchor bolt assembly comprising the steps of:
 a. forming a hole in a mine roof,
 b. placing a container in the hole, the container having therein a chemical anchor resin,
 c. locating at least a part of an elongate member in the hole, the elongate member having an external threaded portion at at least an end thereof remote from said part and the threaded portion having a nut located thereon and including means releasably holding said nut and said elongate member with respect to each other and thereby permitting rotation of the nut and elongate member substantially as a unitary member until a predetermined resistance torque between the clamping member and bolt is exceeded,
 d. driving the nut to cause rupture of the container by the elongate member and thereby releasing the chemical anchor resin,
 e. allowing the chemical anchor resin to set and secure the elongate member, and
 f. applying an increased torque to the nut member, which increased torque is sufficient to overcome said predetermined resistance torque, and thereby permitting rotation of the nut with respect to the elongate member.

2. A method as claimed in claim 1, in which a thread pitch differential is provided between the threaded portions of the nut and elongate member.

3. A method as claimed in claim 1, in which at least one deformation is provided in the nut, which deformation engages with the elongate member.

4. A method as claimed in claim 1, in which at least one deformation is provided in the threaded portion of the elongate member.

* * * * *